(12) United States Patent
Knight

(10) Patent No.: US 6,258,269 B1  
(45) Date of Patent: Jul. 10, 2001

(54) SELF VENT DRAIN VALVE

(75) Inventor: Steven R. Knight, Modesto, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 09/583,152

(22) Filed: May 30, 2000

(51) Int. Cl.⁷ ............................ F16K 24/00; B01D 35/00
(52) U.S. Cl. ..................... 210/248; 210/313; 210/436; 137/588
(58) Field of Search ................................... 210/248, 313, 210/436; 137/588

(56) References Cited

U.S. PATENT DOCUMENTS

| | | |
|---|---|---|
| 732,122 | 6/1903 | Schneider . |
| 1,456,883 | 5/1923 | Deeks . |
| 2,036,990 | 4/1936 | De Faveri . |
| 2,311,320 | 2/1943 | Williams . |
| 2,333,890 | 11/1943 | Russell . |
| 2,533,266 | 12/1950 | Kovacs et al. . |
| 3,207,190 | 9/1965 | Silbereis et al. . |
| 3,211,194 | 10/1965 | Projahn . |
| 3,322,168 | 5/1967 | Kitabayashi . |
| 3,540,402 | 11/1970 | Kocher . |
| 3,606,096 | 9/1971 | Campbell . |
| 4,276,161 | 6/1981 | Matsui et al. . |
| 4,292,179 | 9/1981 | Stone et al. . |
| 4,314,689 | 2/1982 | Wilson . |
| 4,440,193 | 4/1984 | Matheson . |
| 4,502,956 | 3/1985 | Wilson et al. . |
| 4,515,690 * | 5/1985 | Yasuhara . |
| 4,611,627 * | 9/1986 | Eidsuoog et al. . |
| 4,619,764 | 10/1986 | Church et al. . |
| 4,624,779 | 11/1986 | Hurner . |
| 4,708,171 | 11/1987 | Cudaback . |
| 4,724,074 | 2/1988 | Schaupp . |
| 4,740,299 | 4/1988 | Popoff et al. . |
| 4,893,651 | 1/1990 | Herman et al. . |
| 4,922,960 | 5/1990 | Oelschlaegel . |
| 4,976,285 * | 12/1990 | Church et al. . |
| 5,144,978 | 9/1992 | Brown et al. . |
| 5,322,624 | 6/1994 | Rogers et al. . |
| 5,547,565 | 8/1996 | Biere et al. . |

* cited by examiner

Primary Examiner—Thomas M. Lithgow
(74) Attorney, Agent, or Firm—Christopher H. Hunter

(57) ABSTRACT

A drain assembly for a fluid filter includes a female valve portion unitary with an end wall of a collection bowl, and having a socket with a cylindrical sidewall and an inner end wall. The end wall includes a plug, and a vent opening radially outward from the plug. A drain opening is provided in the end wall radially outward from the socket. An annular sealing surface is provided radially outward from the drain opening. A threaded sleeve is provided radially outward from the annular sealing surface. A male valve portion is received in the female valve portion, and includes a valve body and valve seal. The valve seal is received in the socket and includes a cylindrical sidewall defining a vent passage, and an inner end with a vent opening to the vent passage. An annular sealing surface is provided radially outward from the sidewall of the valve seal. The sealing surface on the valve body is sealable against the sealing surface on the bowl end wall, and has an outer diameter sufficient to cover the drain opening in the bowl end wall. The valve body has a drain opening radially outward from the valve seal. The valve body includes a threaded sleeve radially outward from the annular drain opening in the valve body. The threaded sleeve of the valve body cooperates with the threaded sleeve of the female valve portion to enable the male valve portion to be screwed into and outwardly from the female valve portion.

22 Claims, 4 Drawing Sheets

SELF VENT DRAIN VALVE

FIELD OF THE INVENTION

The present invention relates generally to fluid filters, and more particularly to drain assemblies for such filters, which allow contaminants and/or fluid in the filters to be periodically removed.

BACKGROUND OF THE INVENTION

Filter are commonly used to separate contaminants from a fluid stream passing through a fluid system. Many fluid filters use a filter media which has a structure that traps the contaminants either within the media, or causes the contaminants to collect on the outer surface of the media. In certain applications, for example in some fuel systems, a filter will collect particulate matter and/or water on the outside surface of the filter media. The contaminants will then drain or fall down under gravity to a lower chamber in the filter. A drain assembly is provided in the lower chamber to allow such contaminants to be removed. Some applications also require fluid in the filter to be removed prior to an element change. The drain assembly is also used for this purpose.

Many filters include a collection bowl screwed onto the lower end of the filter can to collect the contaminants. A removable collection bowl generally allows the filter element to be removed and discarded and the collection bowl to be re-used. This reduces cost and material waist. Many of such collection bowls are transparent to allow visual confirmation of the contaminants in the collection bowl. Other filters simply have the chamber integral with a lower end wall of the filter can to collect the contaminants.

A common type of drain assembly for such fluid filters includes a valve cap or knob which can be rotated to open a valve and allow the fluid/contaminants to drain out. Such a drain assembly is shown, for example, in Schaupp, U.S. Pat. No. 4,724,074. The Schaupp patent shows a conventional filter element with a removable collection bowl. Popoff, et al., U.S. Pat. No. 4,740,299; Church, et al., U.S. Pat. No. 4,619,764 and Wilson, et al., U.S. Pat. No. 4,502,956 show similar types of filter elements, with and without separate collection bowls, where a drain assembly is provided for removing fluid and other contaminants from the filter.

Many of such drain assemblies are self-venting, that is, they allow air to enter the filter when the valve is opened. This prevents a vacuum from forming within the filter, and facilitates the rapid out-flow of fluid and contaminants from the filter.

While the above-identified drain assemblies are appropriate for many applications, it is believed that there continues to be a demand for drain assemblies that are low in cost, simple to use, and easy to manufacture and assemble.

SUMMARY OF THE PRESENT INVENTION

The present invention provides a new and unique drain assembly for a fluid filter that is low in cost, simple to use, and easy to manufacture and assemble.

According to the principles of the present invention, the drain assembly includes a female valve portion having a socket integral with the end wall of a collection bowl. The socket includes a cylindrical sidewall extending inwardly into the bowl to a distal inner end wall. The inner end wall of the socket includes a plug extending in an axially-outward direction. A vent opening is provided in the end wall radially outward from the plug. A drain opening is provided in the end wall of the bowl radially outward from the socket and fluidly separate from the vent opening. An annular, outwardly-facing sealing surface is defined on the bowl end wall radially outward from the drain opening. A cylindrical threaded sleeve is provided radially outward from the annular sealing surface and extends axially outward from the end wall of the bowl.

The drain assembly further includes a male valve portion received in the female valve portion. The male valve portion has a valve body with an integral valve seal. The valve seal includes a cylindrical sidewall, which is closely received within the cylindrical sidewall of the socket. The cylindrical sidewall of the valve seal defines a central vent passage, and a vent opening is provided at the distal inner end of the valve seal into the vent passage. The valve seal is positioned such that the plug at the end of the socket can be received in, and close, the vent opening in the valve seal. An annular, inwardly-facing sealing surface is defined on the valve body radially outward from the cylindrical sidewall of the valve seal. The annular sealing surface of the valve body is sealable against the annular sealing surface on the end wall of the bowl, and has an outer diameter sufficient to cover (and close) the drain opening in the end wall of the bowl. The valve body further includes an annular drain opening radially outward and fluidly separate from the vent passage in the vent seal.

The valve body includes a cylindrical threaded sleeve radially outward from the annular drain opening in the valve body. The cylindrical sleeve on the valve body cooperates with the cylindrical sleeve of the female valve portion to enable the male valve portion to be screwed into and outwardly from the female valve portion.

When the male portion is screwed into the female valve portion, the vent opening in the valve seal is closed by the plug in the socket, and the annular sealing surface on the valve body seals against the annular sealing surface of the bowl end wall and covers the drain opening in the end wall to prevent fluid flow through the drain assembly. When the male valve portion is screwed outwardly from the female valve portion, contaminants and fluid can flow from the collection bowl through the drain opening in the bowl and through the drain opening in the valve body; and air can flow through the vent passage in the vent seal and through the vent opening in the socket into the collection bowl. The plug of the socket is long enough such that the annular sealing surface of the valve body moves away from the annular sealing surface on the end wall of the bowl prior to the valve seal becoming unsealed from the plug such that fluid drains out of the collection bowl through the drain openings before the air is allowed to enter through the vent openings.

The female valve portion, including the socket and the threaded sleeve, is preferably formed unitary (e.g., molded) with the end wall of the collection bowl. The valve seal and the valve body of the male valve portion are preferably formed separately, and fixed together, such as with a catch on the valve seal being press-fit into an opening in the valve body. The valve seal is preferably formed of an elastomeric material to facilitate creating a fluid-tight seal with the socket. The user simply screws the male valve portion into and outwardly from the female valve portion to allow contaminants and fluid to drain from the filter.

Thus, as described above, the various components of the drain assembly are low in cost, easy to use, and simple to manufacture and assemble.

Further features of the present invention will become apparent to those skilled in the art upon reviewing the following specification and attached drawings.

DETAILED DESCRIPTION OF THE PREFERRED EMBODIMENT

Figure 1:
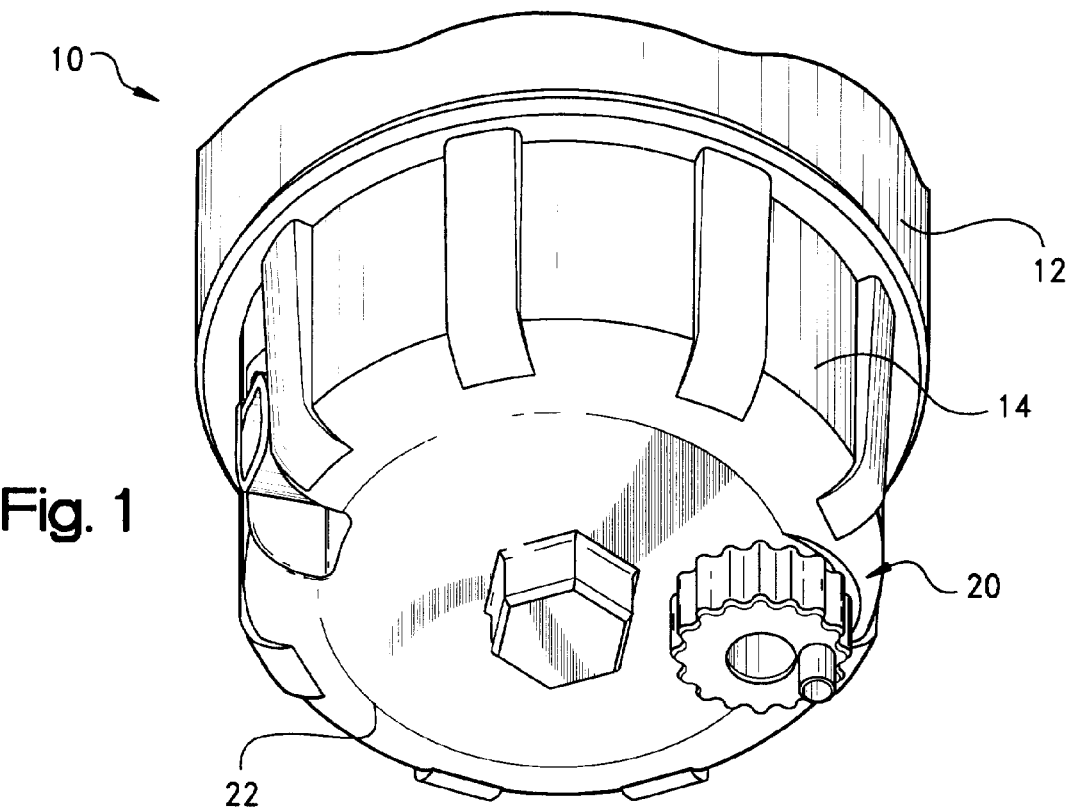
FIG. 1 is a lower perspective view of a portion of a filter having a collection bowl with a drain assembly constructed according to the principles of the present invention.

Referring to the drawings, and initially to FIG. 1, a filter is indicated generally at 10 and includes a metal filter can 12 and a removable plastic collection bowl 14. Collection bowl 14 can be transparent, and includes a series of threads as at 16 to allow the collection bowl 14 to be removably screwed onto and off of the filter can 12. Preferably filter media (not shown) is disposed within filter can 12 to separate contaminants (particulate matter, water, etc.) from a fluid stream flowing through the filter. The contaminants fall downwardly into the collection bowl 14, where they collect. Collection bowl 14 is illustrated as a separate component from filter can 12, however these two components could be unitary (in one piece). Preferably the filter media, filter can 12, and collection bowl 14 are conventional in design, and will not be discussed further for sake of brevity.

A drain assembly, indicated generally at 20, is provided in collection bowl 14, and is preferably located in a lower end wall 22 of the collection bowl. Drain assembly 20 allows contaminants and/or fluid in collection bowl 14 to be easily removed from the collection bowl at periodic intervals and at the discretion of the user.

Figure 3:
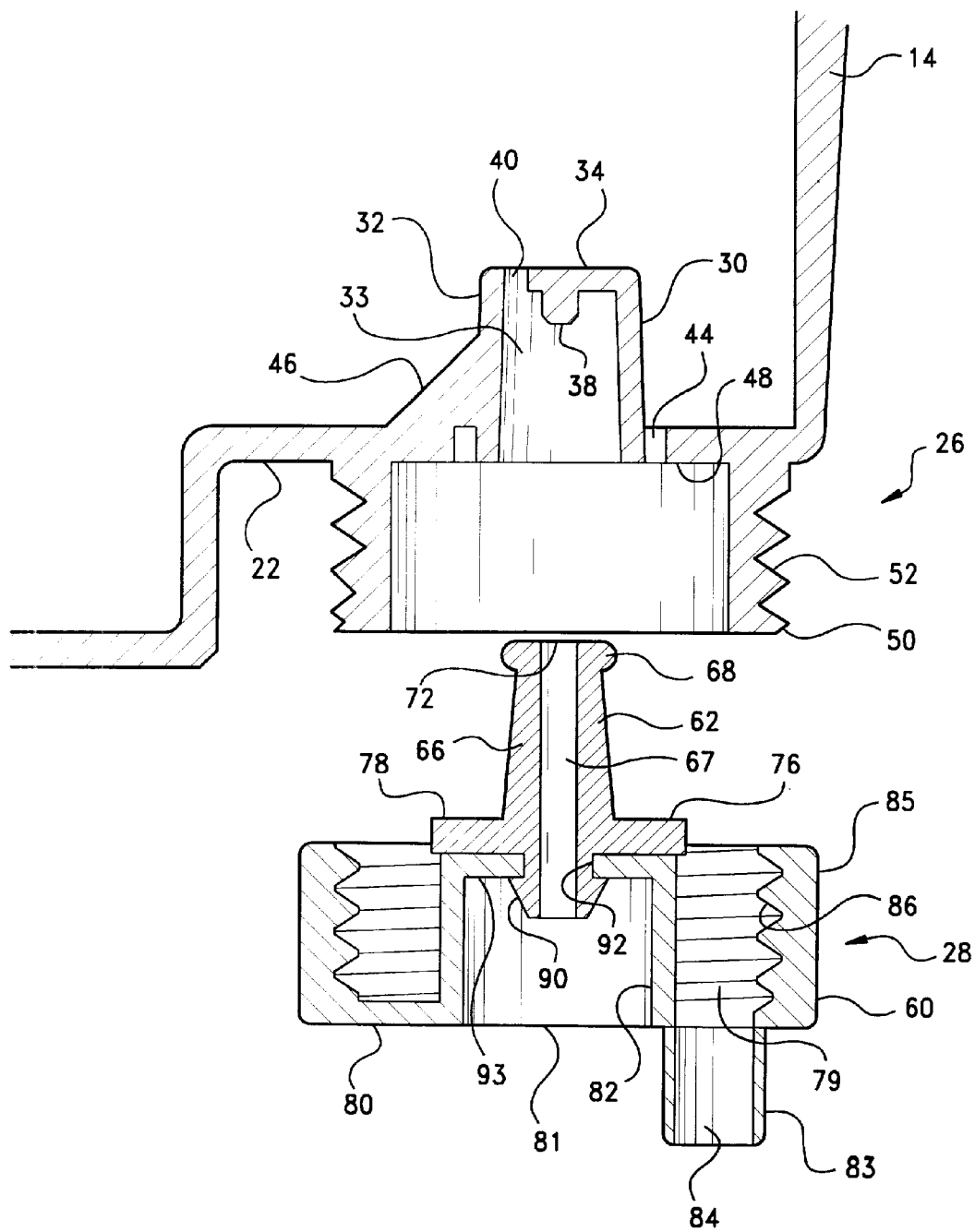
FIG. 3 is a cross-sectional side view of a portion of the collection bowl, showing the male valve portion of the drain assembly removed from the female valve portion.

Referring now to FIG. 3, the drain assembly 20 preferably includes a female valve portion, indicated generally at 26, and a male valve portion, indicated generally at 28. The female valve portion 26 includes a socket 30 having a cylindrical sidewall 32 preferably formed unitary (e.g., molded) with end wall 22. The cylindrical sidewall 32 defines a valve chamber 33. Sidewall 32 extends axially inward into collection bowl 14 to a distal inner end wall 34. A cylindrical plug 38 extends in an axially outward direction from end wall 34. Plug 38 is centrally located on the end wall, and a vent opening 40 is provided through end wall 34, radially outwardly-spaced from plug 38.

Figure 2:
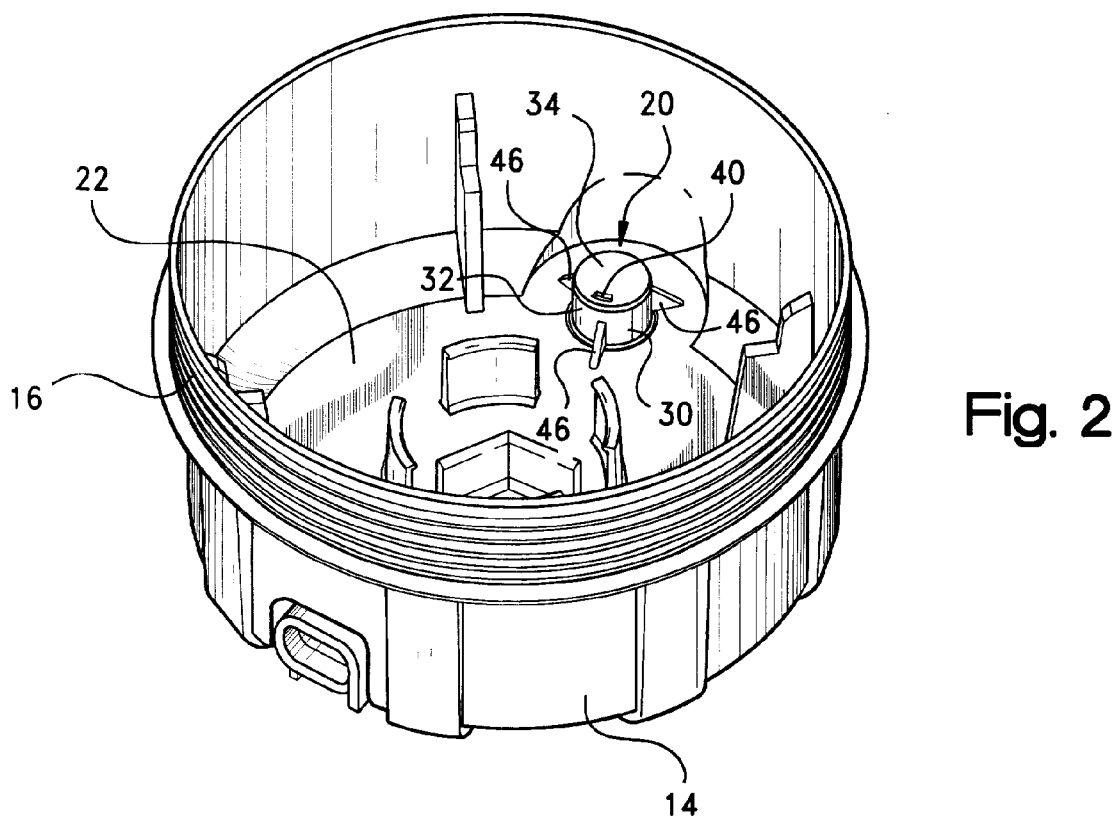
FIG. 2 is an elevated perspective view of the collection bowl and drain assembly of FIG. 1.

An annular drain opening 44 is provided in end wall 22 radially outward from socket sidewall 32. A series of posts or supports 46 are provided around socket 30 to attach socket 30 to end wall 22 (see also FIG. 2).

A first, annular sealing surface 48 is provided radially outward from annular drain opening 44, and faces axially outward, away from end wall 22. A cylindrical sleeve 50, also preferably formed unitary with end wall 22, projects axially outward from the end wall, in radially outward-spaced relation to annular surface 48. Cylindrical sleeve 50 includes a series of outwardly-projecting helical threads 52 along at least a portion of the sleeve.

The male valve portion 28 includes a valve body 60 and valve seal 62. Valve body 60 is preferably formed from plastic, while valve seal 62 is preferably formed from a resilient material, such as an elastomer or rubber. Valve seal 62 includes a cylindrical, slightly tapered, sidewall 66 circumscribing a central vent passage 67, with a radially-enlarged annular end 68. The enlarged end 68 of the valve seal 62 defines a vent opening 72, and is dimensioned to fit closely within the valve 33 of socket 30. The vent passage 67 and vent opening 72 are dimensioned to closely receive cylindrical plug 38 of socket 30, with the cylindrical plug 38 extending axially a short distance into vent passage 67. Valve seal 62 includes an annular base 76, with a flat annular sealing surface 78 facing the annular sealing surface 48 of the bowl end wall 22. The base 76 has an outer diameter such that surface 78 covers and closes annular drain opening 44 in end wall 22 when the surface 78 of base 76 engages surface 48 of the end wall 22.

An annular drain passage 79 is provided in male valve portion 28 radially outward from the annular sealing surface 78 on valve seal 62. Valve body 60 includes an annular end wall 80, with a central opening 81. Opening 81 allows air to enter (or exit) vent passage 67 in vent seal 62. Vent passage 67 is kept fluidly separated from drain passage 79 by a cylindrical intermediate wall 82. A cylindrical drain plug 83 with a central fluid passage 84 extends outwardly from the end wall 80 of valve body 60 to allow fluid to flow outwardly from drain passage 79. Appropriate tubing can be connected to drain plug 82 to direct fluid from the collection bowl.

A cylindrical sleeve 85 is provided radially outward from annular passage 79 in valve body 60. Cylindrical sleeve 85 includes radially inward-directed helical threads 86, along at least a portion of the sleeve, which cooperate with threads 52 on sleeve 50 of the female valve portion 26, to allow the male valve portion to be screwed into and outwardly from the female valve portion.

Valve seal 62 and valve body 60 are illustrated as separate components, and fixed together such as by an annular catch 90 on valve seal 62 being received within a central circular opening 92 defined by a radially-inward directed flange 93 in valve body 60. Valve seal 62 can be fixed to valve body 60 using other techniques, and can even be formed unitary (in one piece) with valve body 60.

Sleeve 895 of valve body 60 can have an exterior knurled geometry (see FIG. 1), to allow body 60 to be easily grasped and rotated by the user.

Figure 4:
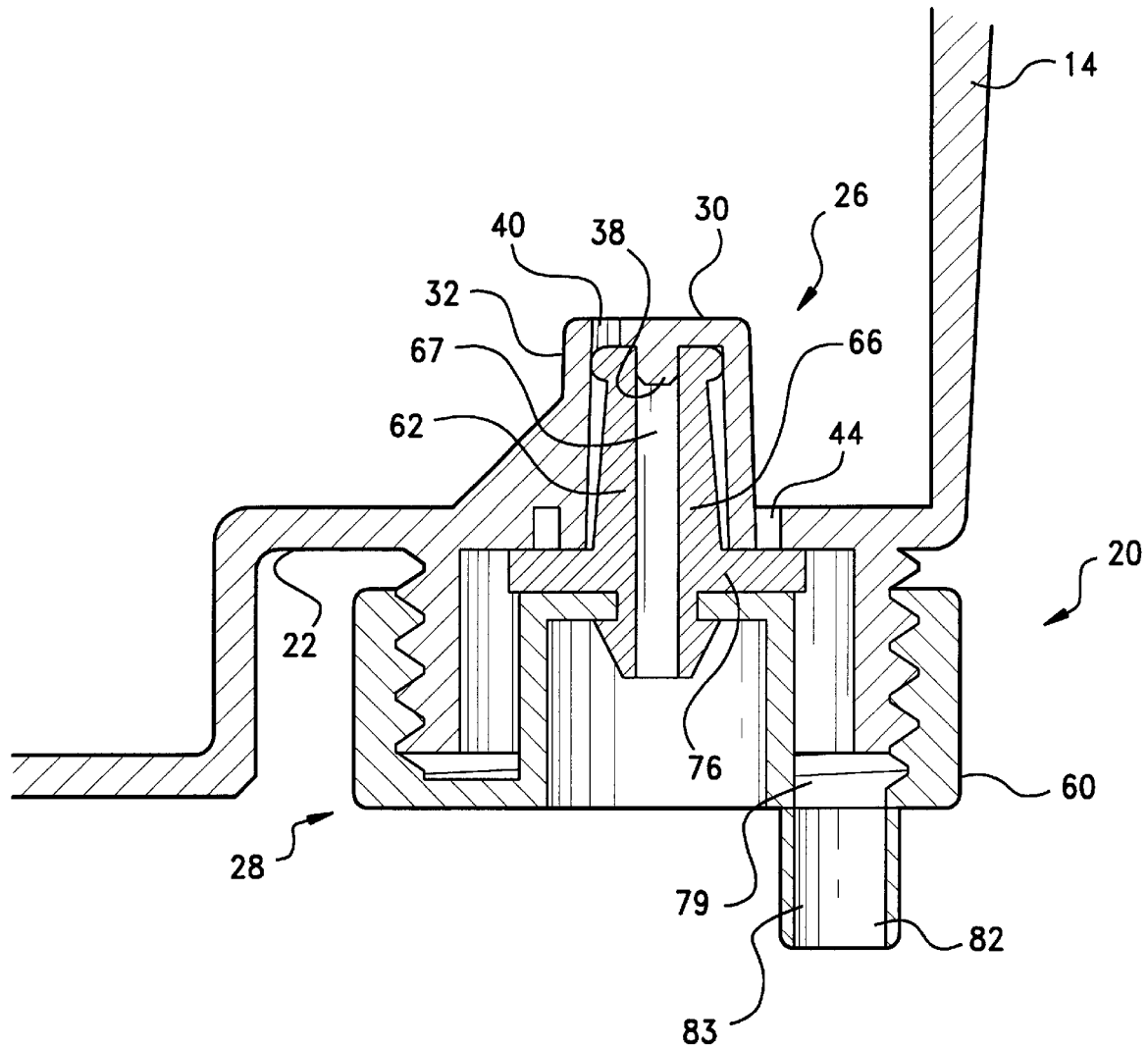
FIG. 4 is a cross-sectional side view of a portion of the collection bowl, showing the drain assembly in a closed position.

Referring now to FIG. 4, the drain assembly 20 is shown in a closed position, where the male valve portion 28 is screwed fully into the female valve portion 26. The cylindrical plug 38 at the distal end of the socket 30 is received within the vent passage 67 in the valve seal 62 to prevent fluid flow through vent opening 40 and vent passage 67. The resiliency of valve seal 62 and the close fitting of the plus 38 in opening 40, and of valve seal 62 in the cylindrical sidewall 32 of socket 30, prevents fluid leakage therebetween.

It can also be seen that base 76 of valve seal 62 engages the end wall 22 of the bowl such that the annular sealing surface of base 76 is in surface-to-surface sealing engagement with the annular sealing surface of the end wall 22, to prevent fluid flow through drain opening 44, annular drain passage 79 and drain passage 84.

Figure 5:
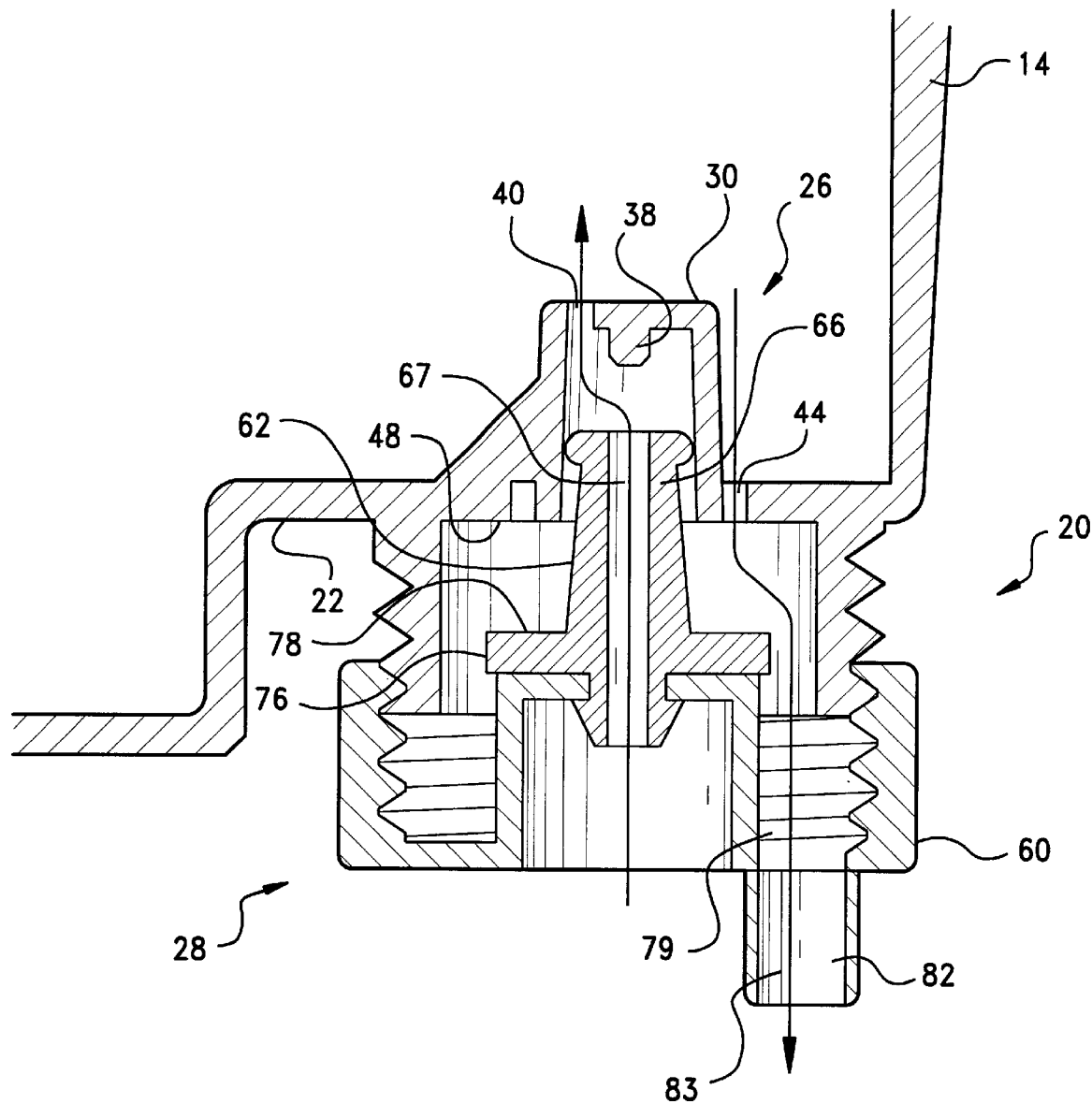
FIG. 5 is a cross-sectional side view of a portion of the collection bowl, showing the drain assembly in an open position.

When it is necessary or desirable to remove fluid and/or contaminants from the collection bowl 14, the male valve portion 28 is screwed outwardly from the female valve portion 26, as illustrated in FIG. 5. As the male valve portion 28 is screwed outwardly, base 76 moves away from surface 48 of end wall 22, such that fluid can flow through drain passage 44, around valve seal 62, and through annular drain passage 79 in valve body 60 to passage 84 in valve plug 83. As fluid within collection bowl 14 drains out, a vacuum develops in the collection bowl. To facilitate the continued draining of fluid, the cylindrical plug 38 at the distal inner end of socket 30 is dimensioned to unseal from vent passage 67 of valve seal 62, such that air can flow through vent passage 67 in valve seal 62 and through vent opening 40 in socket 30 into the collection bowl to relieve the vacuum. Cylindrical plug 38 preferably has a sufficient length such that the plug unseals from vent passage 70 after drain opening 44 is opened, such that the fluid in the collection bowl will pass outwardly through drain opening 44, while air will pass inwardly through vent opening 40.

It should be appreciated that the male valve portion 28 can be easily screwed into or outwardly from the female valve portion 26 to control the flow of fluids from the collection bowl.

The drain assembly 20 is formed of few parts, which are low in cost. The parts are preferably molded, so that they are easy to manufacture and assemble. The drain assembly is also simple to use.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A collection bowl removeably attachable to a filter can, the collection bowl including a drain assembly allowing contaminants to be drained from the collection bowl, the drain assembly including:

a female valve portion including a socket integral with an end wall of the bowl, said socket including an elongated sidewall extending inwardly into the bowl from the end wall and defining a valve chamber opening outwardly from the bowl, said socket including a distal inner end wall, said inner end wall of the socket including a plug extending axially outward from the socket end wall, and a vent opening spaced radially outward from the plug, a drain opening in the bowl end wall radially outward from the socket and fluidly separate from the vent opening, an annular sealing surface on the bowl end wall radially outward from the drain opening and facing outwardly from the bowl end wall, and a cylindrical sleeve radially outward from the annular sealing surface on the bowl end wall and extending axially outward from the bowl end wall, said cylindrical sleeve having a threaded portion; and a male valve portion including a valve body and valve seal, the valve seal including an elongated sidewall defining a central vent passage and received in the valve chamber of the socket, said elongated sidewall of the valve seal including a distal inner end with a vent opening to the vent passage, the vent opening at the distal inner end of the valve seal engageable with the plug at the distal inner end wall of the socket to prevent flow into the vent passage in the valve seal, an annular sealing surface on the valve body radially outward from the cylindrical sidewall of the valve seal and facing toward the end wall of the bowl, said annular sealing surface on the valve body sealingly engageable against the annular sealing surface on the end wall of the bowl, and having an outer diameter sufficient to cover the drain opening in the end wall of the bowl when the annular sealing surfaces are in engagement, the valve body having an annular drain opening radially outward and fluidly separate from the vent passage in the valve seal, and the valve body including a cylindrical sleeve radially outward from the annular drain opening in the valve body and having a threaded portion, said cylindrical sleeve of the valve body cooperating with the cylindrical sleeve of the female valve portion to enable the male valve portion to be screwed into and outwardly from the female valve portion to bring the annular sealing surface on the valve body into and out of sealing engagement with the annular sealing surface on the collection bowl, and the vent opening at the distal inner end of the valve seal into and out of sealing engagement with the plug at the distal inner end of the socket.

2. The collection bowl as in claim 1, wherein the socket is unitary with the bowl end wall.

3. The collection bowl as in claim 1, wherein said drain opening in the bowl end wall is an annular opening bounding the socket.

4. The collection bowl as in claim 1, wherein the vent opening in the socket is formed in the inner end wall of the socket.

5. The collection bowl as in claim 1, wherein said plug is cylindrical.

6. The collection bowl as in claim 1, wherein the valve body and valve seal are separate components, fixed together.

7. The collection bowl as in claim 6, wherein the valve seal includes an annular catch, and the valve body includes a receiving opening, the annular catch of the valve seal being received in the receiving opening in the valve body to fix the valve seal to the valve body.

8. The collection bowl as in claim 7, wherein the valve seal includes an annular base defining the annular sealing surface of the valve body.

9. The collection bowl as in claim 1, wherein the valve seal includes an annular base defining the annular sealing surface of the valve body.

10. The collection bowl as in claim 1, wherein both the sidewall of the socket and the sidewall of the valve seal are cylindrical.

11. The collection bowl as in claim 1, wherein the plug of the socket is received in the vent passage in the valve seal, and the plug is long enough such that the annular surface of the valve body moves away from the annular surface on the end wall of the bowl to allow flow through the drain opening in the bowl end wall and through the drain opening in the valve body before the plug becomes unsealed from the valve seal.

12. A filter having a drain assembly, the drain assembly including:

a. a female valve portion including a socket integral with an end wall of the filter, said socket including an elongated sidewall extending inwardly into the filter from the end wall and defining a valve chamber opening outwardly from the filter, said socket including a distal inner end wall, said inner end wall of the socket including a plug extending in an axially outward direction from the socket end wall, and a vent opening spaced radially outward from the plug, a drain opening in the filter end wall radially outward from the socket and fluidly separate from the vent opening, an annular sealing surface on the filter end wall radially outward from the drain opening and facing outwardly from the filter end wall, and a cylindrical sleeve radially outward from the annular sealing surface on the filter end wall and extending axially outward from the filter end wall, said cylindrical sleeve having a threaded portion; and b. a male valve portion including a valve body and valve seal, the valve seal including an elongated sidewall defining a central vent passage and received in the valve chamber of the socket, said cylindrical sidewall of the valve seal including a distal inner end with a vent opening to the vent passage, the vent opening at the distal inner end of the valve seal engageable with the plug at the distal inner end wall of the socket to prevent flow into the vent passage in the valve seal, an annular sealing surface on the valve body radially outward from the cylindrical sidewall of the valve seal and facing toward the end wall of the filter, said annular sealing surface on the valve body sealable against the annular sealing surface on the end wall of the filter, and having an outer diameter sufficient to cover the drain opening in the end wall of the filter to prevent flow through the drain opening in the filter end wall, the valve body having an annular drain passage radially outward and fluidly separate from the vent passage in the valve seal, and the valve body including a cylindrical sleeve radially outward from the annular drain passage in the valve body and having a threaded portion, said cylindrical sleeve of the valve body cooperating with the cylindrical sleeve of the female valve portion to enable the male valve portion to be screwed into and outwardly from the female valve portion, wherein said vent passage in the valve seal seals against the plug in the socket and the annular sealing surface on the valve body seals against the annular sealing surface of the bowl end wall when the male valve portion is screwed into the female valve portion to prevent fluid flow through the drain assembly; and fluid can flow through the vent passage in the valve seal, through the vent opening in the distal inner end of the valve seal and through the vent opening in the distal inner end wall of the sidewall of the socket into the filter, and fluid can flow from the filter through the drain opening in the filter end wall and through the annular drain passage in the valve body, when the male valve portion is screwed outwardly from the female valve portion.

13. The filter as in claim 12, wherein the socket is unitary with the filter end wall.

14. The filter as in claim 12, wherein said drain opening in the filter end wall is an annular opening bounding the socket.

15. The filter as in claim 12, wherein the vent opening in the socket is formed in the inner end wall of the socket.

16. The filter as in claim 12, wherein said plug is cylindrical.

17. The filter as in claim 12, wherein the valve body and valve seal are separate components, fixed together.

18. The filter as in claim 17, wherein the valve seal includes an annular catch, and the valve body includes a receiving opening, the annular catch of the valve seal being received in the receiving opening in the valve body to fix the valve seal to the valve body.

19. The filter as in claim 18, wherein the valve seal includes an annular base defining the annular sealing surface of the valve body.

20. The filter as in claim 12, wherein the valve seal includes an annular base defining the annular sealing surface of the valve body.

21. The filter as in claim 12, wherein both the sidewall of the socket and the sidewall of the valve seal are cylindrical.

22. The filter as in claim 12, wherein the plug of the socket is received in the vent passage in the valve seal, and the plug is long enough such that the annular surface of the valve body moves away from the annular surface on the end wall of the filter to allow flow through the drain opening in the filter end wall and through the drain opening in the valve body before the plug becomes unsealed from the valve seal.

* * * * *